United States Patent Office 2,767,208
Patented Oct. 16, 1956

2,767,208

METHOD OF MAKING CARBONYL COMPOUNDS BY DECOMPOSING POLYMERIC VINYL PEROXIDES

Alexander A. Miller and Frank R. Mayo, Schenectady, N. Y., assignors to General Electric Company, a corporation of New York No Drawing. Application September 8, 1953, Serial No. 379,076

10 Claims. (Cl. 260—483)

This invention relates to a method of preparing carbonyl compounds. More particularly, this invention relates to the preparation of carbonyl compounds from polymeric peroxides of vinyl compounds by the thermal decomposition of these peroxides. These peroxides may be formed from vinyl compounds by the method disclosed in our copending application Serial No. 379,062, filed concurrently herewith and assigned to the same assignee as the present application.

It is known that some polymeric peroxides of vinyl compounds decompose on heating according to the following reaction:

I  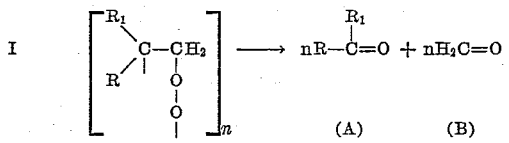 $\longrightarrow$ $nR-\overset{R_1}{\underset{}{C}}=O + nH_2C=O$ (A)    (B)

where $n$ is an integer averaging up to twenty or more, R is a member of the class consisting of alkyl radicals, e. g., methyl, ethyl, propyl, isopropyl, butyl, etc. radicals; aryl radicals, e. g., phenyl, etc.; alkaryl radicals, e. g., tolyl, xylyl, etc.; halogen-substituted aryl radicals, e. g., chlorophenyl, dichlorophenyl, etc.; and Z—O—C(O)— groups where Z is an alkyl radical, e. g., methyl, ethyl, propyl, butyl, etc. radicals; and $R_1$ is hydrogen and alkyl radicals, e. g., methyl, ethyl, propyl, etc. radicals. However, this decomposition has been of little commercial value since there is danger of explosion when a large amount of the peroxide is heated, and even when the decomposition takes place without explosion, the decomposition products react with the remaining peroxide to form high molecular weight gummy residues.

The object of this invention is to produce carbonyl compounds by the thermal decomposition of a polymeric vinyl peroxide without danger of explosion and without reaction between the decomposition products and the polymeric peroxide.

We have discovered that peroxides of the type described above can be thermally decomposed by subjecting a small portion of the peroxide to heat and immediately removing the decomposition products from the reaction zone. More particularly, we have discovered that a suitable decomposition is obtained by dropping small amounts of the peroxide onto an inert surface heated above the decomposition temperature of the peroxide, while removing the decomposition products from the reaction zone with a draft of inert gas. Our invention makes possible the production of carbonyl compounds from polymeric peroxides without danger of explosion or reaction of the decomposition products with the peroxide.

Specific examples of polymeric vinyl peroxides, corresponding to Formula I above, which may be used in the practice of our invention are: polymeric styrene peroxide, polymeric α-methylstyrene peroxide, polymeric methyl acrylate peroxide, polymeric methyl methacrylate peroxide, and polymeric n-butyl methacrylate peroxide.

The term "carbonyl compound" used in this application refers to formaldehyde and carbonyl compounds corresponding to product A in Equation I above and includes, for example, formaldehyde, benzaldehyde, acetophenone, methyl glyoxyalate, methyl pyruvate, n-butyl pyruvate, etc. Typical reactions which produce these carbonyl compounds are listed below, assuming for convenience in writing the equations that the polymeric peroxide used is the single peroxide unit rather than the polymer.

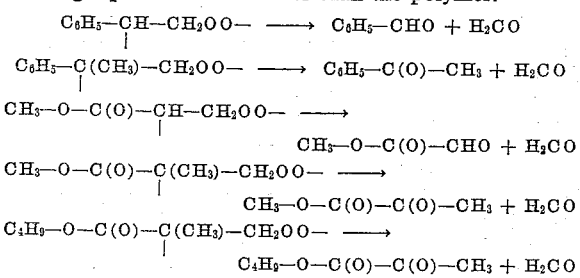

Since most polymeric vinyl peroxides are solids or very viscous liquids up to their decomposition temperatures, it is preferable to use these peroxides in solution in the practice of our invention. Any liquid solvent may be used which does not decompose at the temperature of the heated surface and which has a boiling point below this temperature. Suitable solvents are, for example, benzene, halogenated benzene, and the like. Since polymeric peroxides are usually formed by passing oxygen into the corresponding vinyl monomer, these peroxides are usually available in a solution of the monomeric vinyl compounds. Thus, for example, polymeric styrene peroxide is usually found in a styrene solution. In our invention, the peroxide can be decomposed in the vinyl solution in which it is formed.

The rate of feed and temperature of the proxide solution used in the practice of our invention may vary over a wide range. The rate of feed selected will depend upon such factors as the temperature of the heated surface to which the peroxide solution is being exposed, the area of the surface contacted by the solution, the rate of removal of carbonyl vapors from the reaction zone, etc. The peroxide solution may be fed to the surface dropwise or in a continuous stream from a suitable peroxide storage tank. The peroxide solution is preferably added at room temperature to avoid the possibility of decomposition of the peroxide in solution and to avoid the possibility of polymerization of the solvent when a polymerizable solvent is used. Where the polymeric peroxides have been prepared by the method disclosed in our above-mentioned copending application Serial No. 379,062, the peroxide solution may be fed directly to the heated surface at the solution temperature at which peroxidation has taken place. This temperature may vary from about room temperature (e. g., 25° C.) up to about 90° C. to 100° C.

The heated surface used to decompose the peroxide may be made of any inert material not corroded by the peroxide or the carbonyl compounds formed. Suitable materials include glass, quartz, and metals such as stainless steel, platinum, tantalum, etc. The surface may be heated by any suitable means such as electric resistance heating, radiation, induction, or open flame providing the flame does not come into contact with the reactants. The temperature of the surface must, of course, be high enough to decompose the polymeric peroxide and preferably is below the decomposition temperatures of the carbonyl compounds formed so that there will be almost instant decomposition and flashing into carbonyl compound vapors and solvent vapors. Suitable temperatures are in the range of from about 150° C. to 350° C.

A stream of inert gas is passed over the heated surface to carry away the carbonyl compound vapors as soon as they are formed to prevent reaction between the carbonyl compound vapors and the peroxide or solvent to form complex residues which would decrease the yield of carbonyl compound and also reduce the efficiency of the heating surface. The gas used must be inert with respect to the reactants and products to avoid the formation of contaminating by-products. Suitable inert gases include, for example, nitrogen, helium, argon, carbon dioxide, etc. The inert gas may be at room temperature since its cooling effect on the heated surface is negligible at the relatively low gas rates employed when compared to the heat of decomposition and heat of vaporization of the solvent and the sensible heat of the solvent. The rate of flow of inert gas may vary over a wide range since the inert gas does not take part in the reaction, but is used solely to carry the reaction products and solvent vapors away from the reaction zone. Suitable ratios of inert gas to peroxide feed solution are, for example, from about 100 cc. nitrogen (measured at standard temperature and pressure) per gram of peroxide solution to about 5,000 cc. nitrogen per gram peroxide solution.

After passing the reaction zone, the inert gas containing the formed carbonyl compound vapors and the vapors of the solvent may be treated in any suitable manner to remove the vapors from the inert gas. Since formaldehyde is one product in the decomposition of all vinyl peroxides the vapors can be passed through a water wash to dissolve the formaldehyde and any other soluble carbonyl product. This water wash would also condense all vapors present. The reaction products may also be condensed out by standard cooled condenser methods. The carbonyl compounds and solvent may be separated from the water and from each other by any suitable means such as evaporation or vacuum distillation. The inert gas may be vented to the atmosphere or may be recirculated through the reaction zone to remove more vapors from the reaction zone.

The following examples will illustrate the practice of our invention to those skilled in the art and are not for purposes of limitation.

*Example 1*

Polymeric styrene peroxide was prepared by bubbling oxygen for 24 hours through 900 g. of styrene containing 3.8 g. of α,α'-azodiisobutyronitrile while maintaining the solution at 50° C. The resulting solution was vacuum distilled at 20° C. under 1 mm. to remove the major portion of unreacted styrene and any carbonyl compounds formed. The remaining product was washed repeatedly with methanol to remove the remainder of the styrene and carbonyl compounds, leaving 160 grams of polymeric styrene peroxide product which was analyzed for carbon, hydrogen, and oxygen. This analysis showed the peroxide content to be 93.5 percent. 2.8 grams of this polymeric styrene peroxide, was dissolved in 2.8 grams of benzene at room temperature and added dropwise over a period of 30 minutes to a flash maintained at a temperature of 260° C. to 280° C. in the presence of a slow stream of nitrogen flowing at the rate of about 100 cc./min. The peroxide decomposed instantly upon contacting the hot surface and the products, carried out by the nitrogen stream, were condensed in an ice-cooled receiver. Some material loss occurred as uncondensed fog and 4.2 grams (75% of the weight of solution used) was recovered in the receiver. About 1.4 grams of benzaldehyde was recovered from the condensate as the 2,4-dinitrophenylhydrazone. This corresponds to a conversion of polymeric styrene peroxide to benzaldehyde of about 65%. The formation of formaldehyde as the second product of the decomposition was demonstrated by precipitation of the dimethone derivative.

*Example 2*

Polymeric n-butyl methacrylate was prepared by the method of our above-mentioned copending application, Serial No. 379,062, and 25 grams of a 0.17 molar solution of this polymeric n-butyl methacrylate peroxide in monomeric n-butyl methacrylate at room temperature was added dropwise over a period of 30 minutes onto a glass surface maintained at a temperature of about 350° C. A stream of nitrogen flowing at about 100 to 200 cc. per minute was passed over the glass surface. About 24.3 grams of solution from the reaction was collected in a cooled receiver. The formed n-butyl pyruvate was precipitated as the 2,4-dinitrophenylhydrazone and was filtered out after the solution and precipitate had been cooled to −75° C. Based on the weight of precipitate obtained, the product was a 0.15 molar solution of n-butyl pyruvate, corresponding to a conversion of about 85%. However, the actual percentage was slightly lower than this since the 2,4-dinitrophenylhydrazone contained a small amount of formaldehyde.

*Example 3*

A 25% solution of polymeric styrene peroxide was prepared by dissolving 7.4 grams of the peroxide of Example 1 in 22.20 grams of inhibitor-free redistilled styrene at room temperature. 29 grams of this solution was added dropwise over a period of 30 minutes onto a glass surface maintained at 290 to 300° C. with a 200 cc. per minute flow of nitrogen over the glass surface. The vapors were passed into an ice-cooled receiver and the portions of vapor which did not condense in this receiver were passed to a second Dry-Ice-cooled receiver. 23.7 grams of a clear yellow liquid were obtained in the first receiver and an additional 0.58 gram of paraformaldehyde were collected in the second receiver. The liquid product was pumped for a few minutes on a vacuum line to remove any monomeric formaldehyde and the benzaldehyde content was then determined by precipitation of the 2,4-dinitrophenylhydrazone. The 2,4-dinitrophenylhydrazone corresponded to an 85% yield of benzaldehyde (4.5 g., 0.042 mol) based upon the polymeric peroxide decomposed.

*Example 4*

Polymeric α-methylstyrene was prepared by the method of our above-mentioned copending application, Serial No. 379,062, and a 25% solution of α-methylstyrene peroxide was formed by dissolving 6.71 grams of the peroxide in 20.1 grams of redistilled α-methylstyrene at room temperature. 26.3 grams of this solution were added dropwise into a glass surface using the same methods and conditions as in Example 3. The recovery of acetophenone amounted to 4.6 grams (0.038 mole), which corresponds to an 86% conversion based upon the polymeric peroxide input.

What we claim as new and desire to secure by Letters Patent of the United States is:

1. The method of forming carbonyl compounds from a polymeric vinyl peroxide which comprises (1) dissolving said polymeric vinyl peroxide in a solvent to form a solution, and (2) bringing consecutive portions of said solution into contact with an inert heated surface in an inert atmosphere while simultaneously removing the formed carbonyl compounds from the reaction zone with a stream of inert gas.

2. The method of forming carbonyl compounds from polymeric vinyl peroxide solution which comprises bringing a continuous stream of said solution into contact with an inert surface heated to a temperature of about 150–350° C. in an inert atmosphere while simultaneously removing the formed carbonyl compounds from the reaction zone with a stream of inert gas.

3. The method of forming carbonyl compounds from a polymeric vinyl peroxide which comprises (1) dissolving said polymeric vinyl peroxide in a solvent to form a solution, (2) bringing consecutive portions of said solution into contact with an inert heated surface in an inert atmosphere while simultaneously removing the formed carbonyl compounds from the reaction zone with a stream of inert gas, and (3) separating said formed carbonyl compounds from said solvent and said inert gas.

4. The method of forming carbonyl compounds from a polymeric vinyl peroxide solution which comprises bringing a continuous stream of said solution into contact with an inert heated surface in an inert atmosphere while simultaneously removing the formed carbonyl compounds from the reaction zone with a stream of inert gas, and separating the carbonyl compounds formed from said solution and from said inert gas.

5. The method of forming carbonyl compounds from a polymeric vinyl peroxide dissolved in a vinyl monomer to form a solution which comprises bringing a continuous stream of said peroxide solution into contact with an inert heated surface in an inert atmosphere while simultaneously removing the formed carbonyl compounds from the reaction zone with a stream of inert gas.

6. The method of forming formaldehyde and benzaldehyde from polymeric styrene peroxide which comprises (1) dissolving said peroxide in benzene to form a solution and (2) bringing consecutive portions of said solution into contact with an inert heated surface in an inert atmosphere while simultaneously removing the formed carbonyl compounds from the reaction zone with a stream of inert gas.

7. The method of forming formaldehyde and butyl pyruvate by the thermal decomposition of polymeric butyl methacrylate peroxide which comprises (1) dissolving said peroxide in monomeric butyl methacrylate to form a solution and (2) bringing consecutive portions of said solution into contact with an inert heated surface in an inert atmosphere while simultaneously removing the formed carbonyl compounds from the reaction one with a stream of inert gas.

8. The method of forming formaldehyde and butyl pyruvate by the thermal decomposition of polymeric butyl methacrylate peroxide in a monomeric butyl methacrylate solution which comprises bringing a continuous stream of said solution into contact with an inert heated surface in an inert atmosphere while simultaneously removing the formed carbonyl compounds from the reaction zone with a stream of inert gas.

9. The method of forming formaldehyde and benzaldehyde by the thermal decomposition of polymeric styrene peroxide in a monomeric styrene solution which comprises bringing a stream of said solution into contact with an inert heated surface in an inert atmosphere while simultaneously removing the formed carbonyl compounds from the reaction zone with a stream of inert gas.

10. The method of forming formaldehyde and acetophenone by the thermal decomposition of polymeric α-methylstyrene peroxide dissolved in monomeric α-methylstyrene which comprises bringing a stream of said solution into contact with an inert surface maintained at a temperature above the thermal decomposition temperature of said peroxide and located in an inert atmosphere while simultaneously removing the formed carbonyl compounds from the reaction zone with a stream of inert gas.

References Cited in the file of this patent

FOREIGN PATENTS 676,771    Great Britain _____ Aug. 6, 1952

OTHER REFERENCES

Barnes et al.: J. A. C. S. 72, 210–215.